United States Patent [19]

Wenrick

[11] 4,139,664
[45] Feb. 13, 1979

[54] MECHANICAL SECUREMENT OF EXTRUSIONS

[75] Inventor: Brian A. Wenrick, Dayton, Ohio

[73] Assignee: Protective Treatments, Inc., Dayton, Ohio

[21] Appl. No.: 779,590

[22] Filed: Mar. 21, 1977

[51] Int. Cl.² .......................... B32B 3/10; B32B 27/40
[52] U.S. Cl. ...................................... 428/31; 428/133; 428/139; 428/156; 428/159; 428/163
[58] Field of Search ............... 428/156, 157, 159, 161, 428/163, 167, 99, 133, 31, 138, 139

[56] References Cited

U.S. PATENT DOCUMENTS

| Re. 21,075 | 5/1939 | Freedlander | 428/156 X |
| 3,777,438 | 12/1973 | Brown | 428/31 X |
| 3,959,537 | 5/1976 | Loew | 428/31 |
| 3,982,780 | 9/1976 | Keith | 428/31 X |
| 4,004,774 | 1/1977 | Houston | 428/139 X |
| 4,010,297 | 3/1977 | Wenrick | 428/77 X |

Primary Examiner—Harold Ansher
Attorney, Agent, or Firm—Dressler, Goldsmith, Clement, Gordon & Shore, Ltd.

[57] ABSTRACT

An elongated extruded strip adapted to be mechanically secured to a slotted sheet-like substrate is provided by extruding an elongated thermoplastic strip having a body portion which includes a rear face having a rearwardly projecting rail and then notching out longitudinally spaced portions of the rail to provide longitudinally spaced teeth. The strip is pressed against the sheet to force the teeth through the slots and heat is applied to the portions of the teeth which project through the slots to form a head or bead on the teeth and thereby mechanically secure the strip to the substrate. The strip is preferably formed to include at least one side support and/or at least one resilient adhesive tape may be used to allow the strip to deform when pressed against the substrate to force the teeth to project further through the slots to insure a tight securement. The teeth may have an arrowhead when the sheet-like substrate is of uniform thickness.

4 Claims, 5 Drawing Figures

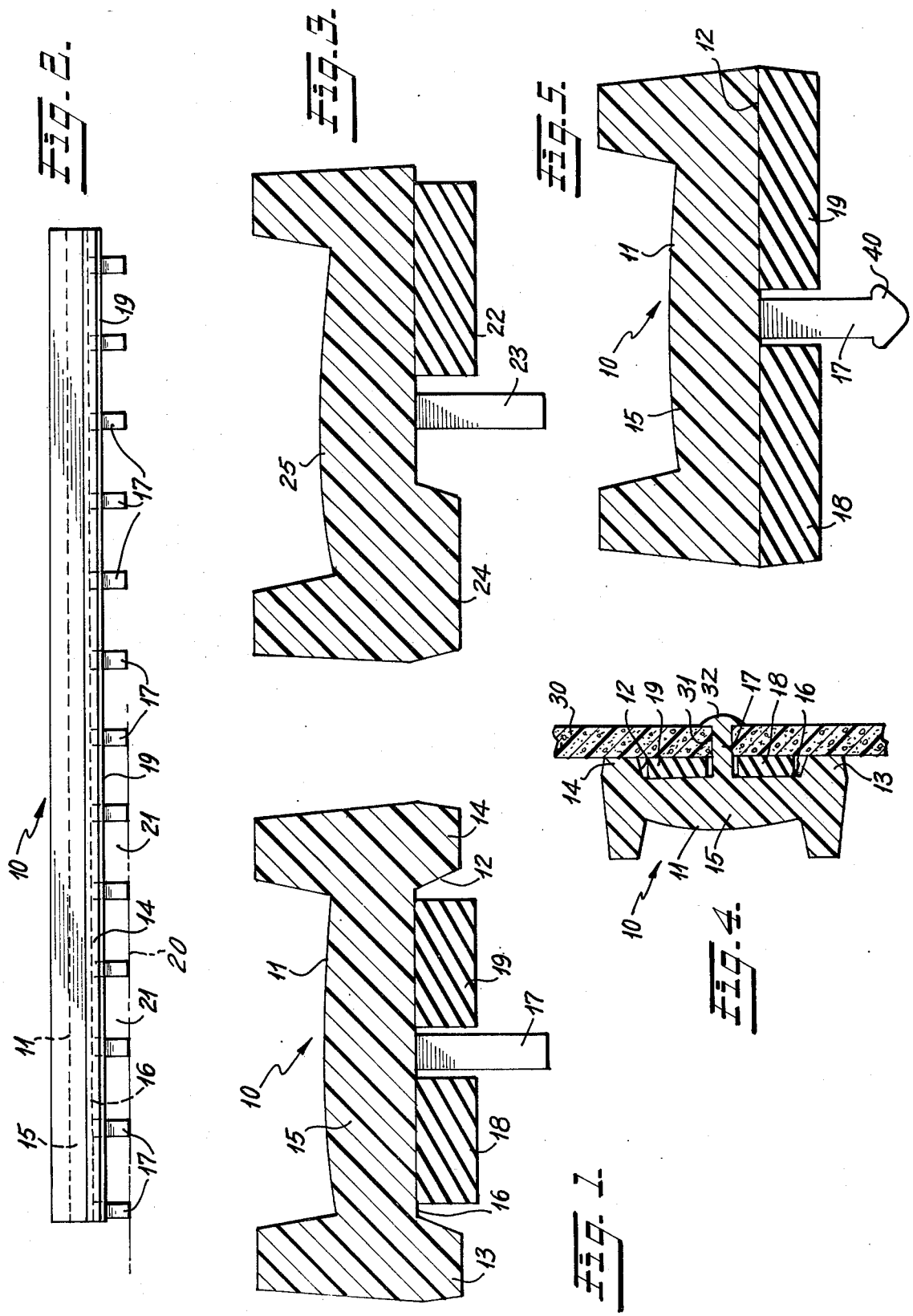

MECHANICAL SECUREMENT OF EXTRUSIONS

The present invention relates to elongated thermoplastic strips or extrusions which are used for decorative and other purposes and to mechanical means for securing such strips to a supporting surface, especially to foamed layers which may possess varying thicknesses. The invention includes a continuous extrusion process for the production of such strips.

In accordance with this invention, a thermoplastic material, such as clear or pigmented polyvinyl chloride, is continuously extruded in any desired cross-sectional configuration including a rear face having at least one rearwardly projecting rail. Longitudinally spaced apart sections of this rail are removed, as by notching, to provide longitudinally spaced rearwardly projecting teeth which enable mechanical securement of the extrusion to a supporting substrate having slots through which the teeth are extended. When the supporting substrate is of constant thickness, then the rail can be preformed to include an arrow-shaped head which can be forced through the slot to expand behind the slot in the substrate and thereby mechanically lock the strip or extrusion to the substrate. When the supporting substrate is of variable thickness, as is encountered with a foamed urethane bumper having a thin facia on which it is intended to mount the extrusion, then the teeth need not include any preformed head. This is because each tooth need merely be extended through the slot and the portion of the tooth which projects through the slot can be heated, with or without pressure, to cause the projecting portion of the thermoplastic tooth to form a bead which locks the tooth in place. The action is similar to that of a rivet which is shaped to form a head at the rear of two slotted structures to be joined, and it does not matter how much of the rivet extends through the slotted structures being joined because the head is formed in situ out of the portion which projects through the slots.

In the preferred practice of this invention, the rear face of the extrusion is formed to include at least one side support and the rearwardly projecting rail is centrally positioned to depend from a recess in the body of the extrusion. In this way, the flexible extrusion can be pressed against the supporting substrate to deform the extrusion and thereby force the teeth to project through the slots in the substrate for a greater distance than would be the case if there were no pressure. Then, when the head is formed by heating the portion of the teeth which projects, the released extrusion is more tightly secured than would otherwise be the case. The same would apply to a tooth preformed with an arrowhead in that the flexibility of the extrusion helps to insure a tight securement.

It is also preferred to employ a resilient adhesive strip or tape on at least one side of the teeth. This allows an adhesive bond to supplement the mechanical securement to the substrate, and it also provides a resilient layer to help hold the extrusion tightly in place. The side support and the resilient strip or tape can be used alternatively or together.

Also, one or more rails can be used to form one or more rows of teeth after the rail has been appropriately notched.

The invention will be more fully understood from a description of some preferred forms of the invention which are illustrative and which are shown in the accompanying drawings in which:

FIG. 1 is a vertical cross-section taken through an extrusion formed in accordance with the invention after the rail portion has been notched out to form securing teeth, the cross-section being taken between adjacent teeth;

FIG. 2 is a side elevation of the extrusion shown in FIG. 1;

FIG. 3 is a vertical cross-section like FIG. 1, but showing an alternate construction in accordance with the invention;

FIG. 4 shows the FIG. 1 extrusion locked in place on a foamed facia; and

FIG. 5 is a vertical cross-section like FIG. 1, and showing a construction using resilient tapes on both sides of a centrally positioned row of teeth with arrowheads.

Referring more particularly to the drawings, FIG. 1 shows an extrusion which would be useful as a bumper insert, sometimes called a nerf strip, in which the strip body 10 has a forward face 11 and a rear face 12, the rear face including side supports 13 and 14 which create a bridge portion 15 providing a recess 16. A tooth 17 projects rearwardly from the bridge portion 15 to provide a mechanical fastening element the action of which will be described more fully hereafter. On either side of tooth 17 within the recess 16 is a layer of butyl tape 18 and 19 which provide an adhesive supplement to the mechanical securement and a resilient layer between the bridge portion 15 and the substrate to which the strip is ultimately secured. This resilient layer helps to supply a firm connection and eases the strain on the teeth 17.

It will be appreciated that the strip body 10 is an extrusion which has been cut to desired length, and this means that the body 10 is of uniform cross-section throughout its length. The tapes 18 and 19 also preferably extend from one end of the strip to the other. The teeth 17 were initially part of a continuous rail 20 shown in phantom in FIG. 2, but spaced portions thereof were notched out as identified by numeral 21 to provide the teeth 17.

A variation in the structure of the strip is illustrated in FIG. 3 where only a single side support 24 is employed with a balancing butyl tape 22 being used on the opposite side of tooth 23. In this form of the invention, the bridge portion 25 flexes between the side support 24 and the single tape 22.

The toothed strip is used in the manner illustrated in FIG. 4 where 30 identifies a foamed polyurethane sheet-like element which is a portion (a facia) of an automobile bumper to which a nerf strip is to be secured. This sheet portion 30 may have a thickness ranging from 0.100 inch to 0.150 inch and is formed to include slots 31 which are spaced to receive the teeth 17. The variation in thickness may exceed the noted limits which are simply illustrative. If sheet portion 30 were of uniform predetermined thickness, then the teeth 17 could be formed with an arrow-shaped head 40 (as shown in FIG. 5), which could be forced through the slot 31. When the thickness of sheet 30 is a variable, the tooth 17 is not headed. Instead, and after tooth 17 is inserted, the portion thereof which extends beyond the sheet portion 30 is heated to cause the plastic to melt and form the head 32. Pressure may be used to shape head 32 as desired, but this is optional.

Any thermoplastic material may be extruded to provide the elongated strip product, polyvinyl chloride (preferably pigmented) being preferred, but other thermoplastics, such as cellulose acetate butyrate or nylon may be used. Flexible materials are particularly preferred, and flexible polyvinyl chloride is available as is also a flexible thermoplastic rubber, and these two flexible thermoplastics may be used in admixture.

I claim:

1. An extrusion adapted to be mechanically secured to a slotted sheet-like substrate, said extrusion providing an elongated strip having a body portion including a rear face having at least one row of centrally positioned longitudinally spaced rearwardly projecting teeth, said rear face of said body portion having secured thereto at least one resilient tape positioned at one side of said teeth.

2. An extrusion adapted to be mechanically secured to a slotted sheet-like substrate, said extrusion providing an elongated strip having a body portion including a rear face having at least one row of longitudinally spaced rearwardly projecting teeth, the rear face of said body portion being formed to include at least one side support so that said teeth extend rearwardly from a recess in the body of the extrusion, and said rear face of said body portion having secured thereto at least one resilient tape positioned at the side of said teeth opposite to the side occupied by said side support.

3. An extrusion adapted to be mechanically secured to a slotted sheet-like substrate, said extrusion being thermoplastic and having a body portion including a rear face which is formed to include at least one side support and a centrally positioned recess from which extends a rearwardly projecting rail which is notched out to form longitudinally spaced rearwardly projecting teeth, said rear face having secured thereto at least one resilient adhesive tape positioned at one side of said teeth.

4. An extrusion adapted to be mechanically secured to a slotted sheet of uniform thickness, said extrusion having a plastic body portion including a rear face which is formed to include a centrally positioned rearwardly projecting rail which is notched out to form longitudinally spaced rearwardly projecting teeth having an arrow-shaped head, said rear face having secured thereto resilient adhesive tapes, one of said tapes being positioned on each side of said teeth.

* * * * *